United States Patent [19]

Salyer et al.

[11] Patent Number: 4,587,279

[45] Date of Patent: May 6, 1986

[54] CEMENTITIOUS BUILDING MATERIAL INCORPORATING END-CAPPED POLYETHYLENE GLYCOL AS A PHASE CHANGE MATERIAL

[75] Inventors: Ival O. Salyer, Dayton; Charles W. Griffen, Mason, both of Ohio

[73] Assignee: University of Dayton, Dayton, Ohio

[21] Appl. No.: 646,396

[22] Filed: Aug. 31, 1984

[51] Int. Cl.⁴ .................. C04B 24/32; C04B 24/34; C08K 9/00; C08K 9/10
[52] U.S. Cl. ........................................ 523/206; 14/73; 52/309.17; 52/596; 52/612; 106/90; 106/94; 106/109; 106/116; 126/400; 165/10; 165/104.17; 428/221; 428/321.5; 428/703; 428/913; 523/135; 524/4
[58] Field of Search ............... 126/400, 430; 106/109, 106/116, 90, 96; 52/309.1, 309.17, 596, 612, 173 R; 165/104.17; 523/135, 206; 524/4; 428/703, 913, 221, 321.5

[56] References Cited

U.S. PATENT DOCUMENTS

| | | | |
|---|---|---|---|
| 3,223,082 | 12/1965 | Smith | 106/111 |
| 3,316,901 | 5/1967 | Smith | 106/111 |
| 3,819,388 | 6/1974 | Cornwell | 106/109 |
| 4,111,189 | 9/1978 | Dizon | 126/400 |
| 4,179,727 | 12/1979 | Prusinski et al. | 52/173 R |
| 4,228,053 | 10/1980 | McLaughlin et al. | 524/4 |
| 4,259,401 | 3/1981 | Chahroudi et al. | 52/302 |
| 4,277,357 | 7/1981 | Boardman | 126/400 |
| 4,290,416 | 9/1981 | Maloney | 52/173 R |
| 4,462,390 | 7/1984 | Holdridge et al. | 126/430 |
| 4,504,318 | 3/1985 | Matsuda et al. | 106/90 |
| 4,504,402 | 3/1985 | Chen et al. | 427/212 |
| 4,505,953 | 3/1985 | Chen et al. | 252/70 |
| 4,513,053 | 4/1985 | Chen et al. | 428/221 |
| 4,524,102 | 6/1985 | Hostettler | 428/318.8 |
| 4,532,917 | 8/1985 | Taff et al. | 126/400 |

OTHER PUBLICATIONS

Vigo et al., "Temperature Adaptable Hollow Fibers Containing Polyethylene Glycols," Journal of Coated Fabrics vol. 12 (Apr. 1983).
Encapsulation of Phase Change Materials in Concrete Masonary Construction Progress Report No. 1 Aug. 1977-Feb. 1978.
Encapsulation of Phase Change Materials in Concrete Masonary Construction Progress Report No. 2, Mar. 1978-May 1978.
"Phase Change Materials Handbook", U.S. Dept of Commerce, National Technical Information Service, 1971, N72-19956 pp. 5-21, 5-49 and 5-50.

*Primary Examiner*—Helen M. McCarthy
*Attorney, Agent, or Firm*—Biebel, French & Nauman

[57] ABSTRACT

A cementitious composition comprising a cementitious material and polyethylene glycol or end-capped polyethylene glycol as a phase change material, said polyethylene glycol and said end-capped polyethylene glycol having a molecular weight greater than about 400 and a heat of fusion greater than about 30 cal/g; the compositions are useful in making pre-formed building materials such as concrete blocks, brick, dry wall and the like or in making poured structures such as walls or floor pads; the glycols can be encapsulated to reduce their tendency to retard set.

19 Claims, 6 Drawing Figures

CEMENTITIOUS BUILDING MATERIAL INCORPORATING END-CAPPED POLYETHYLENE GLYCOL AS A PHASE CHANGE MATERIAL

GOVERNMENT RIGHTS

The U.S. Government has certain rights under this invention.

BACKGROUND OF THE INVENTION

The present invention relates to cementitious compositions embodying phase change materials and, more particularly, to cementitious compositions incorporating polyethylene glycols and/or end-capped polyethylene glycols as phase change materials. These compositions are useful in the manufacture of building materials.

There has been a great deal of interest in phase change thermal energy storage systems due to their inherent ability to store large amounts of heat and release it to the surrounding environment as temperatures drop below a predetermined level. These systems are of particular interest in the architectural and building trades where climate control and its concommitant energy consumption is one of the principal considerations in building design and material selection.

A variety of building materials and techniques have previously been used to conserve heat or cool and thereby reduce energy costs. Included among them are structural elements which incorporate phase change materials. By incorporating phase change materials into building materials, energy in excess of that necessary to maintain comfort conditions is inherently absorbed and released when the surrounding environment drops below the comfort range. Thus, in winter months, phase change materials incorporated into structural elements in the walls or floors of buildings and the like can absorb solar energy during daytime hours and release it to the interior at night as temperatures drop. In summer months, the same phase change material, due to its thermostatic character, conserves coolness by absorbing energy.

Structural elements incorporating phase change materials are more desirable than elements which store only sensible heat because they have a higher capacity to store energy and they absorb and release a large quantum of energy over a very narrow temperature range. A phase change material utilizes its latent heat of fusion for thermal storage. The latent heat of fusion is substantially greater than the sensible heat capacity of the material. That is, the amount of energy a material absorbs upon melting, or releases upon freezing, is much greater than the amount of energy it absorbs or releases upon increasing or decreasing in temperature 1° C. Thus, upon melting and freezing, per unit weight, a phase change material absorbs and releases substantially more energy than a sensible heat storage material which is heated or cooled through the same temperature range. Furthermore, as contrasted with a sensible heat storage material which absorbs and releases energy essentially uniformly over a broad temperature range, a phase change material absorbs and releases a large quantum of energy in the vicinity of its melting/freezing point. This is particularly advantageous in buildings where space is at a premium and energy storage and release are required within a very narrow comfort range.

Among the teachings which were available in the art prior to the present invention are those of U.S. Pat. No. 4,259,401 to Chahroudi et al which discloses both structural and non-structural building materials incorporating phase change materials. These building materials are made up of a rigid porous matrix structure which is impregnated with the phase change material and sealed for waterproofness. Three classes of phase change materials are disclosed, namely, hydrated salts, waxes, and clathrates. Cements, plasters or thermosetting materials may form the rigid matrix. Both pre-formed structural elements such as building blocks, ceiling tiles, and dry wall and poured elements such as walls, floors and partitions are described in the patent. The encapsulation of phase change materials which interfere with set is also disclosed in the patent.

U.S. Pat. No. 4,277,357 to Boardman discloses a thermal energy storage composition similar to some of those described by Chahroudi et al wherein a salt hydrate is incorporated into a hydrated hydraulic cement.

U.S. Pat. No. 4,111,189 to Dizon discloses a combined solar collector and thermal energy storage device in which the collector employs phase change matrix comprising a phase change material dispersed in a polymeric matrix. The preferred phase change material is polyethylene glycol having a molecular weight in the range of 4500 to 20,000.

SUMMARY OF THE INVENTION

The present invention is directed to cementitious compositions which are useful in thermal energy storage and include polyethylene glycol and/or an end-capped polyethylene glycol in a dispersed state as a phase change material.

It has been found that polyethylene glycols and end-capped polyethylene glycols have relatively high heats of fusion (typically greater than 30 cal/gm) and melt at temperatures which make them useful as phase change materials for climate control, deicing, or in active solar energy storage systems.

It has been more particularly found that PEG's and end-capped PEG's are compatible with conventional cementitious compositions and mixing procedures. Consequently, they can be implemented by the cement and building industry relatively easily and without substantial modification of conventional techniques. They are also particularly desirable as phase change materials because they are relatively inexpensive, they are available in a range of melting points depending on molecular weight, and their phase change characteristics can be modified through blending. Thus, it is possible to optimize their heat retention/releasing characteristics to satisfy a particular end use.

Accordingly, a principal object of the present invention is to provide a cementitious composition which incorporates a polyethylene glycol or an end-capped polyethylene glycol as a phase change material.

A further object of the present invention is to provide a cementitious composition useful in the manufacture of pre-formed or poured cement products exhibiting desirable thermal energy storage characteristics.

A still further object of the present invention is to provide cementitious compositions useful in bridge deck or roadway deicing.

Another object of the present invention is to provide cementitious compositions incorporating end-capped polyethylene glycols having good setting characteristics and reduced sensitivity to moisture or high humidity.

Still another object of the present invention is to provide cementitious compositions including encapsulated polyethylene glycols.

BRIEF DESCRIPTION OF THE DRAWINGS

The present invention will be explained in more detail by reference to the following drawings wherein.

DETAILED DESCRIPTION OF THE INVENTION

Polyethylene glycols and end-capped polyethylene glycols can be incorporated into substantially any known cementitious composition and function as a phase change material. Accordingly, the teachings of the present invention are applicable to cementitious materials previously known or compositions developed in the future. The only interaction which tends to limit the usefulness of PEG's in cementitious compositions is the highly hygroscopic nature of the PEG's (as opposed to end-capped PEG's) themselves. As discussed below, however, this limitation can be overcome by end-capping, encapsulating the PEG in a polymeric shell, or dispersing the PEG in a polymer or rubber.

The cementitious compositions of the present invention include a cementitious material as a rigid matrix-forming material. Typical examples of useful cementitious materials are hydraulic cements, gypsum, plaster of paris, lime, etc. Portland cement is by far the most widely used hydraulic cement. The term "hydraulic cement" as employed herein includes those inorganic cements which, when mixed with water, set and harden as a result of chemical reactions between the water and the compounds present in the cement. Portland cements are ordinarily used for construction purposes. Types I, II, III, IV, and V may be used. White cements, air entrained cements, high alumina cements, masonry cements can also be used.

Concretes are mixtures of such hydraulic cements and inert aggregates. Typical aggregates include conventional coarse aggregates such as gravel, granite, limestone, quartz sieve, etc., as well as those materials conventionally referred to as fine aggregates such as sand and fly ash. Conventional hydraulic cement concretes, e.g., Portland cement concretes, employ major amounts, i.e., over 50%, usually up to about 75% by volume of such aggregates in the set product. These cements and concretes fall within the term "cementitious material" as it used herein.

The cementitious compositions of the present invention also include concrete and plaster compositions useful in the manufacture of pre-formed materials such as concrete blocks, dry wall, and the like as well as in forming poured concrete structures such as used in forming the walls, floors, floor pads and partitions of buildings. In addition, the compositions of the present invention are also useful in road, runway and bridge deck deicing as well as in solar active storage that operates effectively in the 40°-65° C. temperature range wherein polyethylene glycols having molecular weights greater than 1500 up to the ultra high molecular weight polyethylene oxides having molecular weights of 200,000 and higher are used.

The PEG's and end-capped PEG's used as phase change materials in the present invention have molecular weights greater than 400 and up to several million. Included in the term "polyethylene glycol" or "PEG" are polyethylene oxides (PEO's), by which name the higher molecular weight PEG's are known in the art.

The energies of the phase changes of PEG's and end-capped PEG's do not show a smooth correlation with molecular weight, but, in broad outline, as the molecular weight of the PEG increases, so do the fusion/crystallization energies until a constant value of about 40 cal/g is reached at molecular weights of 1000 and higher. This can be seen from the results of Reference Example 1 below. PEG's having molecular weights of 1500 and 8000 are anomolous in this respect and this may be due to the molecular weight distribution in the material or other unknown factors. All of the PEG's and end-capped PEG's used in this invention have phase change energies greater than 30 cal/g.

Figure 1:
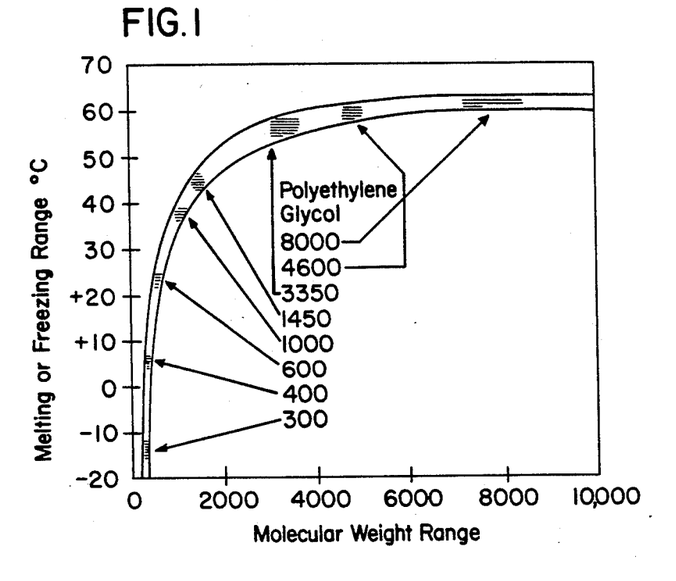
FIG. 1 is a plot of the melting point of polyethylene glycols as a function of molecular weight.

While heats of fusion/crystallization of PEG's vary directly with their molecular weight. FIG. 1 is a plot of melting points and freezing points of PEG's as a function of molecular weight. Melting point varies the fastest in the molecular weight range of 300 to 1500 rising from about $-15°$ C. to 45° C. with that molecular range whereafter it increases more slowly to a limiting melting point of about 63° C.

By appropriately selecting PEG's, it is possible to achieve any desired melting point within a range of about $-15°$ C. (300 molecular weight) to about 63° C. (molecular weight greater than 8000). For climate control, heating and cooling, it is desirable to use PEG's or end-capped PEG's having melting points in the range of about 16° to 42° C. Consequently, for use in passive energy storage systems such as building materials, walls, floors, and the like, the polyethylene glycols and end-capped polyethylene glycols preferably have a molecular weight in the range of about 600 to 1500.

For deicing applications, melting points of about 1° to 20° C. (preferably 5° to 15° C.) are desirable. Hence, for these applications, polyethylene glycols falling within a relatively narrower, low molecular weight range of 450 to 550 are desirable.

The compositions of the present invention may also be useful in certain active thermal energy storage systems, such as solar collectors. Here, melting points up to about 63°, the maximum for PEG's, are useful and, as such, polyethylene glycols ranging from about 3500 to several million (polyethylene oxides) in molecular weight are used.

Figure 2:
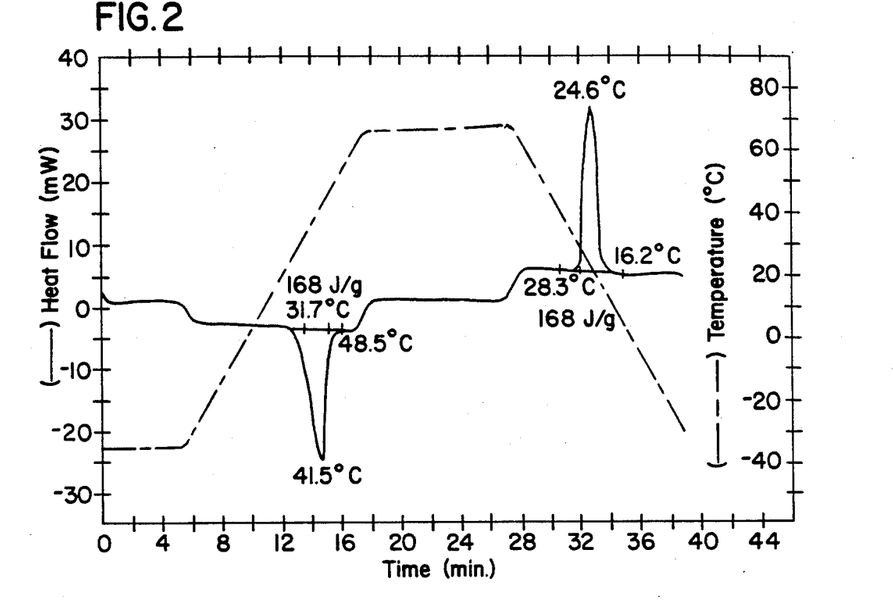
FIGS. 2-5 are differential scanning calorimetry (DSC) diagrams for selected polyethylene glycols and blends useful in the present invention.
Figure 3:
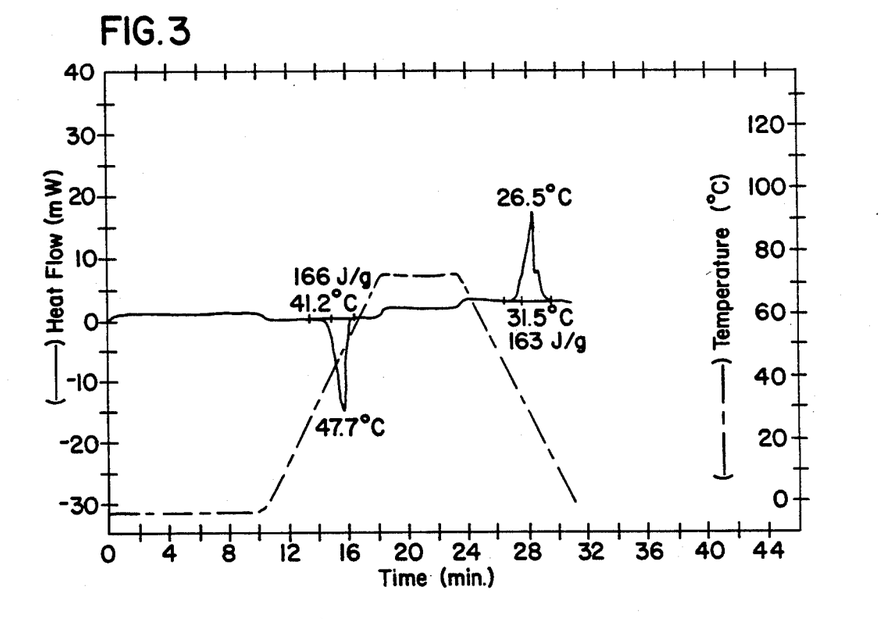
Figure 4:
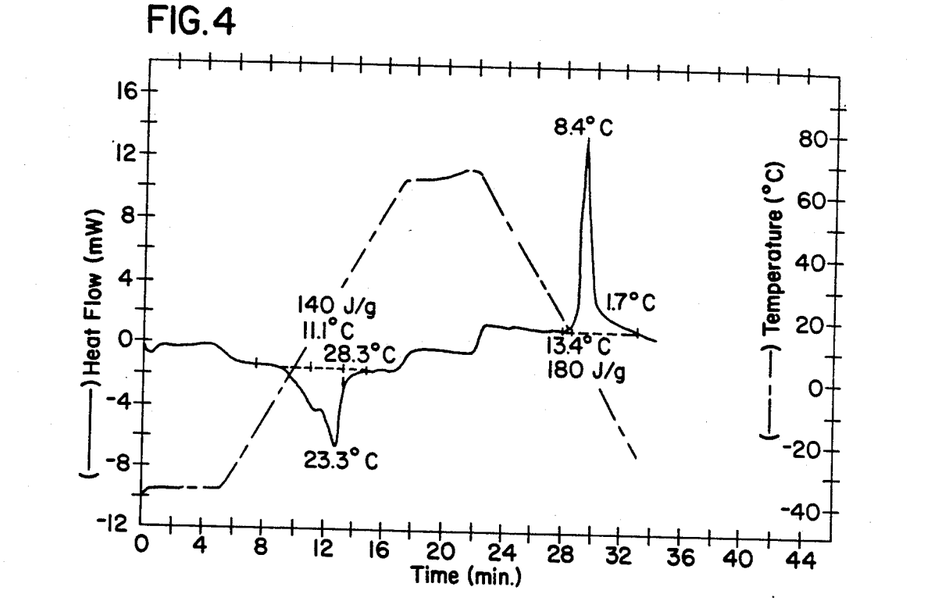
Figure 5:
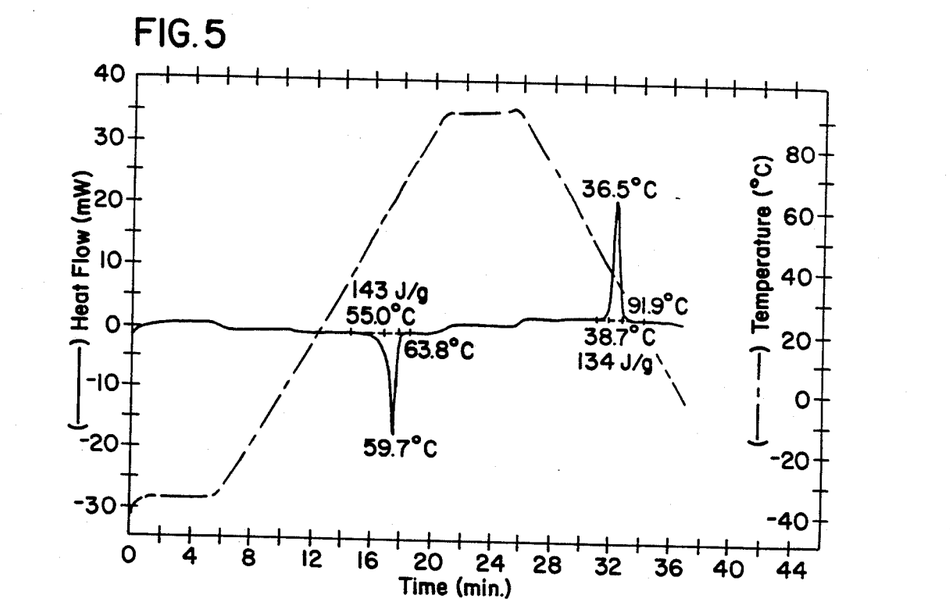

To illustrate the phase change characteristics of polyethylene glycols and end-capped polyethylene glycols, differential scanning calorimeter curves are provided in FIGS. 2-5 for commercially available 1000 (FIG. 2; and 1500 (FIG. 3) molecular weight polyethylene glycols and a 750 (FIG. 4) molecular weight methoxy capped PEG (Carbowax 750). FIG. 5 is a differential scanning calorimeter curve for a 100,000 molecular weight polyethylene oxide.

Figure 6:
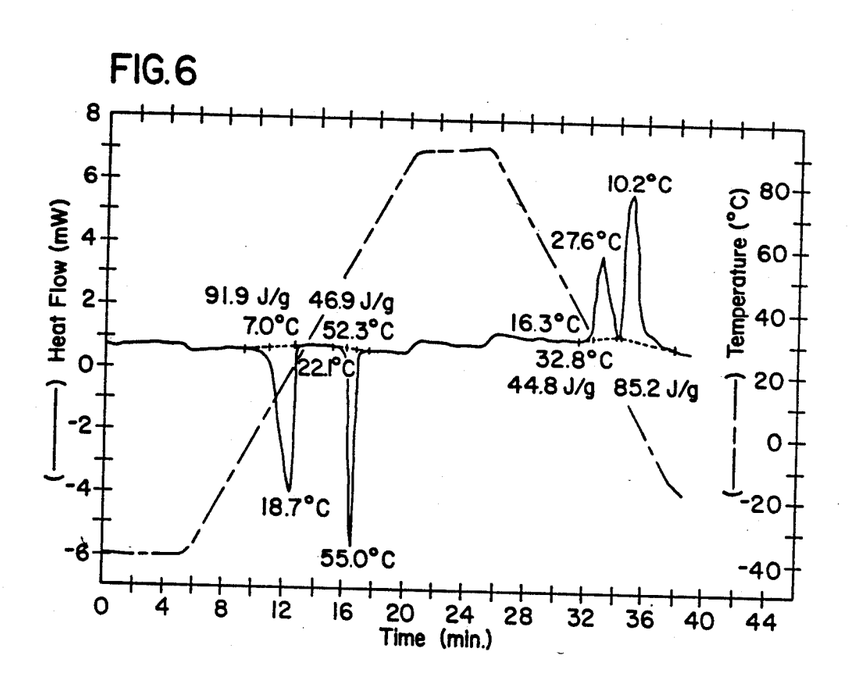
FIG. 6 is a differential scanning calorimetry curve for a blend of 600 and 8000 molecular weight PEG's.

In most cases, the melting/freezing points of polyethylene glycols can be modified by blending polyethylene glycols or end-capped polyethylene glycols having different melting/freezing points to obtain a phase change material having an intermediate melting/freezing point. This practice can be used to tailor the thermal storage characteristics of the phase change material to meet the requirements of the particular end use. Thus, PEG's having molecular weights of 1000 and 1500 can be blended to produce a phase change material which melts at 45° C. It has been found, however, that if the molecular weights of the blended polyethylene glycols are sufficiently different, they retain their respective melting/freezing points and heats of fusion and compositions having two phase change temperatures can be prepared. This is illustrated in FIG. 6 which is the differential scanning calorimeter curve for a blend of 50 parts 600 and 50 parts 8000 molecular weight polyethylene glycols. As the curve illustrates, in the blend each of the glycols exhibits a separate latent heat of fusion and melting/freezing point. These materials offer the ability to design building materials which perform optimally in both heat storage and cool storage or for use in both active and passive thermal energy storage systems. The blend illustrated in FIG. 6 is particularly useful in that it could store solar heat for winter heating, and night time "cool" for summer cooling in a single composition.

As a general rule, separate heats of fusion and melting points can be maintained as long as the difference in the molecular weights of the polyethylene glycols is at least 2000, and one of the two blend components has a molecular weight of 1000 or less. The phase change materials can be blended in any ratio depending upon the performance characteristics desired. Ratios of 1/10 to 10/1 are useful.

The cementitious compositions of the present invention can be used to form pre-formed building materials such as cement blocks and dry wall or poured on site. Since the polyethylene glycols and end-capped polyethylene glycols having molecular weights in excess of about 500 are crystalline solids at room temperature, these materials can be incorporated into a cementitious composition as a dry powder or in aqueous solution. In either case, because PEG's are quite water soluble, they are ultimately dissolved in the water and thereby dispersed in the cementitious matrix.

In forming poured producrs, the PEG can be mixed with the cementitious matrix material in a conventional cement mixer, premixed in dry form with the cement, or sprayed into a mold with cement and aggregate.

The PEG's can be incorporated into cementitious compositions in amounts of up to 25% by weight, depending on the form of the polyethylene glycol used. Theoretically, there is no lower limit on the amount of PEG or end-capped PEG that is used since some thermal energy storage benefit (although small) accompanies any addition.

Where PEG (molecular weight 600 to 1500) per se is added to a cementitious composition, it has been found that that set is retarded significantly if the amount of PEG exceeds about 5%. This is apparently the result of the high affinity which the terminal hydroxy groups in PEG have for water. This tendency can be overcome or reduced by end-capping the glycol, by dispersing the PEG in a polymeric or rubber material as discussed below.

The term "end-capped" PEG's refers to PEG's in which at least one and preferably both of the terminal hydroxy groups are reacted and includes alkoxy-capped PEG's, urethane-capped PEG's, ester-capped PEG's and like compounds. Methoxy capped PEG's (in which only one of the two terminal hydroxyl groups is reacted) can be used in higher amounts than polyethylene glycol before set is undesirably retarded. In addition to methoxy capped polyethylene glycols, specific examples of other end-capped PEG's that can used in the present invention include those end-capped by etherification with long chain, $C_{18}$ and esterification with formic and acetic acids and long chain $C_{18}$ alkyl hydrocarbon acids such as stearic, oleic and the like. The etherification and esterification with $C_{18}$ alcohols and acids can be used advantageously to obtain reduced water sensitivity and enhanced storage simultaneously. From the standpoint of incorporating phase change materials into cement without retarding set, end-capped PEG's and more particularly di-end-capped PEG's are prepared.

To reduce set retardancy, polyethylene glycol can be added to the cementitious composition dispersed in a polymeric or high molecular weight material in the form of a pellet or granule. This isolates the PEG from the cementitious composition and, more particularly, water and removes the adverse effect of the hydroxy groups on the setting properties of the composition. Thermosetting or thermoplastic polymers may be used. For ease of incorporation, it is desirable to disperse PEG's in polar polymers or rubbers. Typical examples include nylons, polyesters, polyvinyl alcohol, polyvinyl acetate, vinyl chloride/vinyl acetate copolymer, neoprene, copoly(butadiene/acrylonitrile), acrylate and methacrylate rubbers, neoprene and copoly(ethylene/-vinylacetate). However, less polar rubbers such as natural rubber, butyl rubber, polybutadiene, copoly(-butadiene/styrene) and copoly(ethylene/propylene) (EPDM) can also be used, although more intensive mixing is necessary. These polymers are characterized in that they are sufficiently compatible with the PEG's, that the PEG's can be incorporated in them in relatively high concentrations (e.g., 50 phr or higher). Depending on the type and molecular weight of the PEG's and the polymer, the PEG in the polymer may be present in dissolved form or as a separate phase of discrete droplets. This latter type of dispersion does not prevent the melting and crystallization of the phase change material.

Pellets or granules are formed by incorporating PEG in the polymer, and cutting or grinding the polymer to produce particles ranging from about 0.25 to 3.0 mm in particle size.

The polymer can be crosslinked or uncrosslinked. In cementitious compositions, thermal form stability is generally not important and, as such, the pellets can be used in an uncrosslinked form. The PEG can be dispersed in the polymer in an amount of about 10 to 100 parts per 100 parts of polymer. In higher concentrations, the PEG is present in the polymer in dissolved and dispersed form.

Fillers such as finely divided silica and carbon black may also be advantageously added in amounts ranging from 10 to 100 parts per 100 parts of polymer. So formed, PEG/polymer pellets can be dispersed in a cementitious composition in an amount up to 50% by weight.

It is advantageous to disperse the PEG's in rubbers having significant crystallinity that they can also function as phase change materials. Natural rubber reportedly has phase transitions at −6° and 25° C. Neoprene reportedly has a crystalline melting point at about 32° C., as is desirable for comfort heating. Other semi-crystalline rubbers include EPDM and copoly(ethylene/vinyl acetate) rubbers. Hence, a crystalline matrix rubber containing dispersed PEG can provide augmented thermal energy storage capacity since both parts of the composite contribute.

Another technique that can be used to prevent PEG's from retarding set is to add the PEG in solid/crystalline form to a solution of a polyisocyanate such as tolylene diisocyanate or the like whereupon the hydroxyl groups at the surface of the PEG crystal react with the diisocyanate. This has the effect of producing a thin urethane shell about the crystal which isolates the internal hydroxy groups from the cement composition. This material can be incorporated into the cementitious composition in dry form. It does not retain water or otherwise interfere with the setting properties of the concrete because the hydroxyl groups at the surface of the phase change material are engaged in a urethane linkage and, at the same time, such a minimal amount of reaction with the isocyanate occurs that the modified PEG retains its crystalline heat of fusion and melting point.

A still further modification that can be used to avoid set retardency in compositions designed for active solar storage systems is to form crosslinked PEG pellets. PEG's can be crosslinked chemically by reaction with crosslinking agents such as dicumyl peroxide or polyisocyanate or it can be crosslinked by radiation such as electron beam.

Crosslinking can also be used to form pellets useful in climate control or deicing. In crosslinking the phase change material for this purpose, it is important that the degree of crosslinking be limited to that necessary to make the PEG form stable and prevent its dissolution in water. If the PEG is too highly crosslinked, it loses the mobility required for crystallization and hence loses the phase change thermal energy storage capacity.

Another way to produce pre-formed building materials and avoid interfering with the curing of the cement matrix is to pre-form a porous matrix and impregnate the matrix by immersing it in a PEG solution. Porous cement matrices are conventionally formed using such materials as air-entraining cement. These cements, when pre-molded into a concrete block, slab or tile have a large pore volume that can be infiltrated with the PEG. In many cases where this technique is used, however, it is essential to seal the pre-formed element in an impermeable sealing material such as polyvinylidene chloride or paint to prevent the PEG from slowly being extracted from the block by rain water or the like.

Building materials such as dry wall and sheet rock can be prepared by the molding or infiltration techniques described above for the concrete blocks. However, because these materials typically have a laminar structure wherein the cementitious matrix material is laminated between sheets of Kraft paper, it is also possible to apply the PEG as a film on one or both faces of the sheet before or after application of the Kraft paper. In this case, it is desirable to form a coating composition comprising the phase change material dispersed in one of the aforesaid polymers. Preferably, the two are codissolved in a common solvent. This composition can be coated upon a pre-formed slab of dry wall prior to application of the Kraft paper or thereafter.

In preparing dry wall, the hygroscopicity of the PEG presents less of a set retardency problem. It is generally possible to use up to about 20% by weight PEG without undesirably retarding set.

In climates where ice forms on the surfaces of sidewalks, streets, highways, bridges, and other structural objects normally formed of concrete or other conventional structural materials, the compositions of the present invention can be advantageously employed to provide suitable pre-formed elements (such as tiles) or poured-on-site installations (such as roadways) which will store and release heat to retard or prevent surface ice formation. In such applications, the melting point of the phase change material is selected to be a few (preferably about 10° C.) degrees above the freezing point of water. For this reason, PEG's ranging from about 450 to about 600 in molecular weight are required. When the average daily temperature of the atmosphere is higher than the melting point of the PEG, it melts and stores this energy for release during the colder night time when the temperature goes below 0° C. Thus, ice will never form on the surface of the road during the night, following a day of above 10° C. temperature. If the average daily temperature drops below the melting point of the PEG, then surface ice can form, but it will tend to form later and melt sooner than if conventional materials had been used.

Roads, pathways, bridge decks, and roadbeds designed for vehicles can also be constructed of the materials of the present invention. Preferably cement, aggregate, and PEG are poured on site.

The cementitious compositions of the present invention may also include additives conventionally used in the art to modify setting or other performance characteristics. Typical additives that may be advantageously used in the present invention include accelerators, aggregates, reinforcing fibers, pozzolans and the like. These additives are employed in the amounts in which they are conventionally used. Representative examples of accelerators include calcium chloride, alkali silicates, etc.

Reference Example 1

The phase change temperatures and energies of a series of PEGs of average molecular weight ranging from 600 to 14000 were determined using a DuPont Model 912 Dual Cell Differential Scanning Calorimeter (DSC) interfaced with a DuPont 1090 Thermal Analyzer. The cell constants for this instrument were determined using Indium and Tin standards. The energies of the fusion endotherms of the standard materials were found to be within 2.6 to 6.2% of the literature values. The fusion temperature and energy of Gallium was used to check the instrument calibration in the temperature region of interest for the PEGs. The fusion temperature of Gallium was 1.2% high (found 30.1° C., literature 29.25° C.) and the enthalpy of fusion was 1.5% low (found 18.87 cal/g, literature 19.16 cal/g) which is considered to be within experimental error. Temperature control in a cooling experiment in the DuPont DSC is not as accurate as temperature control in the heating mode of operation.

Each sample was put through four sequential heat-cool cycles at a heating/cooling rate of about 10° C./minute in a nitrogen atmosphere. Excellent precision of measurement was obtained. Experimental values are summarized in Table 1.

TABLE 1
PHASE CHANGE PROPERTIES OF POLY (ETHYLENE GLYCOLS)

| Molecular Weight | T + s (°C) | | | $\overline{H}$ + s (cal/g) |
|---|---|---|---|---|
| | Onset (ext) | Maximum | Final | |
| Fusion | | | | |
| 600 | 5.6 ± 0.8 | 21.6 ± 2.5 | 31.4 ± 2.5 | −32.65 ± 0.50 |
| 1000 | 27.7 ± 1.5 | 42.9 ± 2.3 | 51.4 ± 1.6 | −40.85 ± 1.04 |
| 1500 | 41.4 ± 0.2 | 48.7 ± 0.9 | 55.5 ± 1.8 | −39.74 ± 0.13 |
| Fusion | | | | |
| 3400 | 50.7 ± 0.6 | 61.8 ± 0.6 | 68.7 ± 0.9 | −46.11 ± 0.63 |
| 8000 | 49.6 ± 0.7 | 62.0 ± 0.4 | 68.3 ± 1.5 | −41.40 ± 1.23 |
| 14000 | 52.9 ± 1.1 | 63.7 ± 0.5 | 71.4 ± 2.5 | −46.90 ± 1.18 |
| Crystallization | | | | |
| 600 | 9.7 ± 0.6 | 6.1 ± 0.8 | −13.4 ± 2.1 | 31.69 ± 0.50 |
| 1000 | 32.6 ± 3.2 | 26.9 ± 3.4 | 8.6 ± 5.1 | 38.94 ± 0.48 |
| 1500 | 33.4 ± 1.7 | 28.9 ± 3.5 | 20.9 ± 8.5 | 36.71 ± 4.28 |
| 3400 | 42.5 ± 0.2 | 38.1 ± 1.0 | 30.5 ± 0.5 | 41.81 ± 0.72 |
| 8000 | 43.2 ± 2.0 | 39.3 ± 0.2 | 27.0 ± 1.4 | 38.45 ± 0.42 |
| 14000 | 45.8 ± 0.5 | 43.5 ± 0.7 | 30.2 ± 2.4 | 44.36 ± 0.36 |

It is well documented in the thermal analysis literature that the temperatures at which thermal events occur are a function of the DSC heating rate. Consequently, the temperatures reported in Table 1 are to be considered as representative of the range over which both fusion and crystallation of the PEGs will occur.

REFERENCE EXAMPLE 2

One particularly advantageous feature of PEGs as phase change materials is that they generally do not exhibit a large supercooling effect. The amount of supercooling observed in the DSC experiments at heating/cooling rate of ±10° C./minute are summarized in Table 2.

TABLE 2
AMOUNT OF SUPERCOOLING IN POLY (ETHYLENE GLYCOLS)

| Molecular Weight | Onset (ext) | Maximum |
|---|---|---|
| 600 | (+4.1) | −15.5 |
| 1000 | (+4.9) | −16.0 |
| 1500 | −8.0 | −19.8 |
| 3400 | −8.2 | −23.7 |
| 8000 | −6.4 | −22.7 |
| 14000 | −7.1 | −20.2 |

Two different values are reported for each PEG. The extrapolated on-set temperature of the phase change is affected by the integration limits selected for the peak and consequently is not as accurate as the maximum temperature value. This is reflected by the parenthetical values of the extrapolated on-set temperature "supercooling" values for PEG 600 and PEG 1000. With these two exceptions, supercooling ranges from a minimum of −6.4° C. for PEG 8000 to a maximum of −23.7° C. for PEG 400. Again, both superheating and supercooling may be a function of the heating and cooling rates, and nucleation; and, thus will be less pronounced at the much slower heating and cooling rates of the actual application. Additionally, however, we have found that small percentages (e.g., 10% weight) of higher molecular weight PEG 8000 can be used in PEG 1000 to reduce the supercooling to about ½ the value of Table 2 above.

The present invention is illustrated in more detail by the following non-limiting examples.

EXAMPLE 1

15 g of polyethylene glycol, molecular weight 1000, was dissolved in warm water in an amount of about 25% by weight and the solution was added to 150 g of plaster of paris. Additional water was added to adjust the consistency and facilitate setting. The mixture was placed in a ½ inch by 4 inch diameter circular mold and allowed to harden. A differential scanning calorimeter analysis (DSC) was performed as in Reference Example 1. The analysis showed that in the plaster, the glycol retained its heat of fusion and melting point.

EXAMPLE 2

20 g of polyethylene glycol 1000 was dissolved in warm water in a concentration of about 20%. This solution was added to a mixture of sand (300 g) and Portland cement (100 g). The mixture was poured into a mold and allowed to harden. DSC analysis showed that the glycol retained its original heat of fusion and melting point.

EXAMPLE 3

22.5 g of polyethylene glycol, 600 molecular weight, was dissolved in 100 g of water. The solution was added to 150 g of plaster of paris and poured into a mold as in Example 1. DSC analysis was performed as in Reference Example 1 and showed that the 600 glycol retained its heat of fusion and melting point.

Having described the invention in detail and by reference to preferred embodiments thereof, it will be apparent that modifications and variations are possible without departing from the scope of the appended claims.

What is claimed is:

1. A cementitious composition useful in the manufacture of building materials comprising an inorganic cementitious building material and an end-capped polyethylene glycol dispersed therein as a phase change material, said end-capped polyethylene glycol having a molecular weight greater than about 400 and a heat of fusion greater than about 30 cal/g, wherein said end-capped polyethylene glycol is selected from the group consisting of alkoxy-capped polyethylene glycol, urethane-capped polyethylene glycol, and ester-capped polyethylene glycol.

2. The composition of claim 1 wherein said cementitious material is selected from the group consisting of portland cement, gypsum, and plaster of Paris.

3. The cementitious composition of claim 1 wherein said phase change material is a di-end-capped polyethylene glycol.

4. The cementitious composition of claim 3 wherein said phase change material is a methoxy end-capped polyethylene glycol.

5. The cementitious composition of claim 1 wherein said end-capped polyethylene glycol has a molecular weight in the range of about 600 to 1500.

6. The cementitious composition of claim 2 wherein said cementitious material is portland cement and said end-capped polyethylene glycol is present in an amount up to about 5% by weight.

7. The cementitious composition of claim 2 wherein said cementitious material is plaster of Paris and said end-capped polyethylene glycol is present in an amount up to about 20% by weight.

8. The cementitious composition of claim 1 wherein said phase change material is a blend of end-capped polyethylene glycols having distinct melting points such that said blend exhibits two distinct melting points and two distinct heats of fusion.

9. The cementitious composition of claim 8 wherein said blend comprises end-capped polyethylene glycol having a first molecular weight of 1000 or less and an end-capped polyethylene glycol having a second molecular weight and the difference between said first molecular weight and said second molecular weight is at least 2000.

10. The cementitious composition of claim 2 wherein said end-capped polyethylene glycol is incorporated into said cementitious composition in the form of a pellet or granule, said pellet or granule being formed from a polymer material having said phase change material dissolved and/or dispersed therein, wherein said polymer material is other than said end-capped polyethylene glycol and said polymer material isolates the dispersed phase change material from the cementitious composition.

11. The cementitious composition of claim 10 wherein said polymer is a natural or synthetic rubber.

12. The cementitious composition of claim 10 wherein said polymer is selected from the group consisting of nylons, polyesters, polyvinyl alcohol, polyvinyl acetate, ethylene vinylacetate copolymer, butadiene-acrylonitrile copolymer, acrylate and methacrylate rubbers, neoprene, natural rubber, butyl rubber, polybutadiene, butadiene/styrene copolymers and EPDM.

13. The cementitious composition of claim 10 wherein said polymeric material is crosslinked or uncrosslinked.

14. The cementitious composition of claim 13 wherein said phase change material is end-capped by reaction with a polyisocyanate.

15. A building block comprising an inorganic cementitious matrix having dispersed therein an end-capped polyethylene glycol as a phase change material, said end-capped polyethylene glycol having a molecular weight greater than about 400 and a heat of fusion greater than about 30 cal/g, wherein said end-capped polyethylene glycol is selected from the group consisting of alkoxy-capped polyethylene glycol, urethane-capped polyethylene glycol, and ester-capped polyethylene glycol.

16. The building block of claim 15 wherein said end-capped polyethylene glycol has a molecular weight of about 600 to 1500.

17. A dry wall comprising, gypsum and an end-capped polyethylene glycol dispersed therein as a phase change material, said end-capped polyethylene glycol having a molecular weight greater than about 400 and a heat of fusion greater than about 30 cal/g, wherein said end-capped polyethylene glycol is selected from the group consisting of alkoxy-capped polyethylene glycol, urethane-capped polyethylene glycol, and ester-capped polyethylene glycol.

18. The dry wall of claim 17 wherein said end-capped polyethylene glycol has a molecular weight of about 600 to 1500.

19. A bridge deck prepared from the cementitious composition of claim 1.

* * * * *